United States Patent [19]
Capdepuy et al.

[11] Patent Number: 6,068,081
[45] Date of Patent: May 30, 2000

[54] METHOD FOR DAMPING VIBRATION AND THE PRESSURE WAVE FROM A MATERIAL

[75] Inventors: Marc Capdepuy, Fontenilles; Florent Haddad, Cugnaux; Alain Le Méhauté, Gif sur Yvette, all of France

[73] Assignee: Artec Aerospace, France

[21] Appl. No.: 09/051,126

[22] PCT Filed: Sep. 20, 1996

[86] PCT No.: PCT/FR96/01471

§ 371 Date: Apr. 1, 1998

§ 102(e) Date: Apr. 1, 1998

[87] PCT Pub. No.: WO97/11451

PCT Pub. Date: Mar. 27, 1997

[30] Foreign Application Priority Data

Sep. 27, 1995 [FR] France .................................. 95 11243

[51] Int. Cl.[7] .................................................. F16F 15/00
[52] U.S. Cl. ........................................... 181/207; 181/208
[58] Field of Search ..................................... 181/207, 208, 181/209, 290, 291, 294, 295

[56] References Cited

U.S. PATENT DOCUMENTS

| 3,615,961 | 10/1971 | Meyer . | |
|---|---|---|---|
| 4,828,202 | 5/1989 | Jacobs et al. | 181/208 |
| 5,710,396 | 1/1998 | Rogers | 181/208 |
| 5,895,538 | 4/1999 | Hatayama et al. | 181/207 |

FOREIGN PATENT DOCUMENTS 1 622 072  1/1972  Germany .

*Primary Examiner*—Khanh Dang
*Attorney, Agent, or Firm*—Parkhurst & Wendel, L.L.P.

[57] ABSTRACT

A method for reducing the amplitude of vibration and the pressure wave (6) from a radiating surface (5) and/or an incident surface (3) of a material exposed to mechanical and/or acoustic vibration. The material consists of an anisotropically shaped heavy resilient structure with an internal geometry capable of deflecting and localizing vibration (7) within the structure. A specific material may be incorporated into the areas where vibrational energy is localized in order to convert the vibrational energy into another form of energy.

23 Claims, 4 Drawing Sheets

METHOD FOR DAMPING VIBRATION AND THE PRESSURE WAVE FROM A MATERIAL

FIELD OF THE INVENTION

The present invention relates to a process to damp the amplitude of vibrations and the pressure wave radiated by a material which is exposed to mechanical and/or acoustic vibrations.

The present invention also relates to the material made by applying the process according to the invention.

When a wall is exposed to an incident pressure wave, or when it is vibrated by mechanical means, the incident pressure wave and/or the vibrations are transmitted through the structure of the material from the incident surface to its radiating surface.

The invention relates both to vibratory and acoustic waves as well as to the field of infrasonic and ultrasonic waves.

The aim of the invention is to reduce the amplitude of the waves transmitted by preventing a vibrating mechanical system from generating a vibro-acoustic wave in the surrounding environment, or by isolating a sound wave from another area, either to insulate a noisy piece of apparatus, or to protect a sensitive system from mechanical vibrations induced by the waves.

The damping obtained by means of the invention can reach some tens of decibels in the case of acoustic waves.

STATE OF THE ART

To reduce the acoustic energy transmitted by a wall, several known solutions are currently in use.

One known device consists in increasing the mass of the walls which separate the source of sound from the area to be protected.

This solution is efficient over a wide range of frequencies. Doubling the mass of the walls enables a gain of around 4 dB (decibels), but requires more space and greater mass. This solution is difficult to implement when a gain of several tens of decibels is required.

Another means to perform high acoustic insulation is to use multiple walls. For example, one double wall composed of a first wall, a volume of air or a resilient material and a second wall. Such a complex structure enables the acoustic insulation to be improved without over-increasing the mass, if the resilient material is of very low density. However, to use such a resilient complex structure requires substantial thickness.

It is also known to use a porous material to perform acoustic insulation. The energy contained in the incident acoustic wave is dissipated by increasing the apparent viscosity of the environment with respect to the air inside the material pores. This type of solution requires the pore size to be fully adapted to the main frequency components present in the noise spectrum, whose transmission or reflection are to be avoided. This solution also involves the use of relatively thick structures.

A foam-based material can be inserted between two rigid walls. The assembly acts as an isotropic structure whose technical properties are used merely to absorb part of the vibrations.

There is another solution to reduce the vibrations of structures which may cause acoustic radiation consisting in equipping the structures with viscoelastic walls able to damp the structures. This solution results in excess mass for a limited gain in performance.

SUBJECT OF THE INVENTION

A first subject of the invention consists in developing a process to enable substantial vibro-acoustic damping to be obtained by using a low density composite material.

A second subject of the invention consists in performing substantial acoustic insulation requiring relatively low excess mass.

A third subject of the invention consists in preventing the vibrating of a structure material.

To this end, the process according to the invention to damp the amplitude of vibrations radiated by the surface of a material exposed to vibrations, of mechanical and/or acoustic origin, uses a material made of an anisotropically-shaped heavy resilient structure having an inner geometry able to divert and localize the internal vibrations of the structure.

According to one characteristic of the invention, the modification of wave vibration direction is carried out from a direction substantially perpendicular to the incident surface to a substantially parallel direction parallel to or close to a parallel of the radiating surface.

According to another characteristic of the process, the vibration direction of the wave is transformed from linear to rotating, thereby avoiding the generation of acoustic waves.

According to another characteristic of the process, the modification of the nature of the vibrations (direction, rotation, amplitude) can be used so that internal specific relative displacements of the material allow the vibratory energy to be converted into another form of energy.

According to another characteristic of the invention, the internal structure of the material between the incident surface and the radiating surface is formed by a combination by assembling and/or superposing and/or juxtaposing geometric structural units in several dimensions which give the structure an asymmetrical architecture.

DESCRIPTION OF THE DRAWINGS

Other advantages and characteristics of the invention will become apparent after reading the following description of embodiments of the invention, given by way of explanatory example and illustrated by the appended drawings, in which.

DESCRIPTION OF A PREFERRED EMBODIMENT

Figure 1:
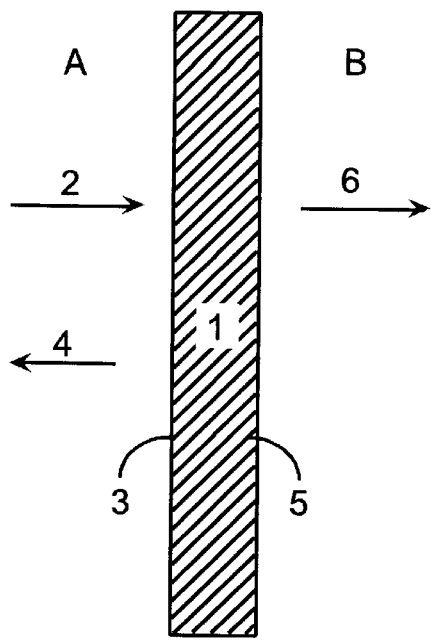
FIG. 1 is a schematic view of the principle of wave transmission through a material.

FIG. 1 schematically illustrates the principle of transmission of a pressure wave between two environments A and B separated by a material 1 which can be a wall whose inner structure is anisotropical.

The invention is applied to sound, ultrasonic or infrasonic vibratory pressure waves; the sound wave stated in the present description is given merely by way of example.

The sound wave emitted at A generates an incident pressure whose direction is shown by arrow 2.

This wave is partly reflected by incident surface 3 (arrow 4) and is transmitted through the internal structure of material 1, which it vibrates through to radiating surface 5, whose vibration is transmitted to environment B (arrow 6).

Depending on the mass and thickness of the wall of material 1, the wave transmitted will be more or less damped. The wave transmitted by radiating surface 5 can be generated by the mechanical vibrating of material 1, rather than by a sound wave emitted at A, which is likely to generate a pressure wave.

The aim of the process according to the invention is to damp the pressure wave generated by radiating surface 5 of material 1 exposed to vibrations 2, of mechanical and/or acoustic origin, at incident surface 3, said material being made of an anisotropically-shaped heavy resilient structure. A resilient structure is to be understood as a material whose particles generate strains proportional to the relative displacements which are imposed upon them.

When such a material is exposed to strains likely to vary through time, and which stem from mechanical stressing or from a pressure wave, the surfaces of the material react by moving thereby generating pressure, and possibly sound, waves, which are radiated by said surfaces. According to the process in accordance with the invention, suitable shaping of the inner geometry of the material enables the wave to be deviated, and the vibrations to be localized and/or their direction in the structure to be modified.

Figure 2:
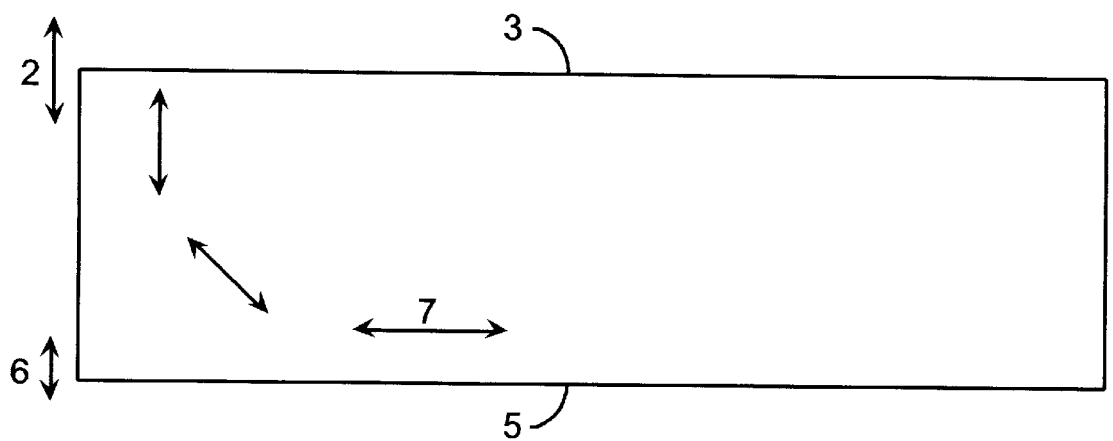
FIG. 2 is a diagram illustrating an embodiment of the process according to the invention.

As shown schematically in FIG. 2, initial vibrations 2, which are directed substantially perpendicularly to incident surface 3, are gradually deviated by the geometry of the anisotropic structure of material 1 until reaching a direction, as shown by arrow 7, substantially parallel to radiating surface 5, thereby substantially damping (arrow 6) transmission from environment A to environment B.

Such deviation is obtained by suitable shaping of the structure or microstructure of material 1 which transforms the superficial movements of incident surface 3, or which transforms the surface stresses due to the pressure of a pressure wave 2, into internal complex distortions in the anisotriopical part of the material. The complex distortions of the inner structure of material 1 are such that they reduce the generation by the surface of am acoustic wave in an area required to be protected.

By way of example, this invention can be applied by deviating, by a predetermined angle, the direction of vibratory wave 2 by transforming the translation of the particles in the surface of the material exposed to the source of vibration (acoustic and/or mechanical) into the movements, in one or several different directions, of other particles of the structure of the material which do not generate an acoustic wave transmitted to the area to be protected.

The interface areas of material 1 likely to generate a sound wave are thus eliminated. In fact, sound waves are generated by a translation of solid surfaces perpendicular to contact with the air environment.

The invention enables particle translations to be converted into local rotations. The areas of the material in which internal rotations occur thus convert the acoustic energy into kinetic and inner elastic energy, with no emission of acoustic waves. This invention is based on the control of the degrees of inner liberty of the particles forming the inner structure of the material.

The physical properties of material 1 can be numerically simulated by the following equations; if x is the state vector of degrees of liberty of the particles forming the material (whether inner or surface), the properties of the heavy resilient structure of material 1 can be numerically simulated by a differential equation of the following type:

$$(M) \cdot (d^2x/dt^2) + (F) \cdot (dx/dt) + (K)x = (S) \cdot (P) + (A)$$

where (M), (F), (K), (S) are matrices depending on the structure and geometry of the inner structure, (P) is the vibro-acoustic pressure vector generated by the material surface, and (A) the vector dependent on the stresses imposed on the material (acoustic and/or Mechanical). Using this differential equation, it is possible to obtain the transfer function between the vibro-acoustic wave (P) generated by the material and the applied stressing (A); the change in direction of the vibrations is obtained by optimizing this transfer function.

Optimizing the internal micro-geometry and nature of the material enables a reduction in the energy radiated by the vibro-acoustic wave (P) to be obtained.

According to the invention, the internal structure of the material between incident surface 3 and radiating surface 5 is formed of a combination by juxtaposing, or superposing, or transversal or longitudinal nesting of pluridimensional geometrical structural units which create an asymmetric anisotropical structure, that is, which present, along any one of their axes, full asymmetrical structural units, and asymmetrical cavities which help to disturb wave transmission.

The element named "structural unit" in the present description is a geometrical body entering into the composition of the material structure. This body has at least two dimensions, and can be formed by assembling beams, bars, solid volumes, plane surfaces or more complex forms.

Figure 3:
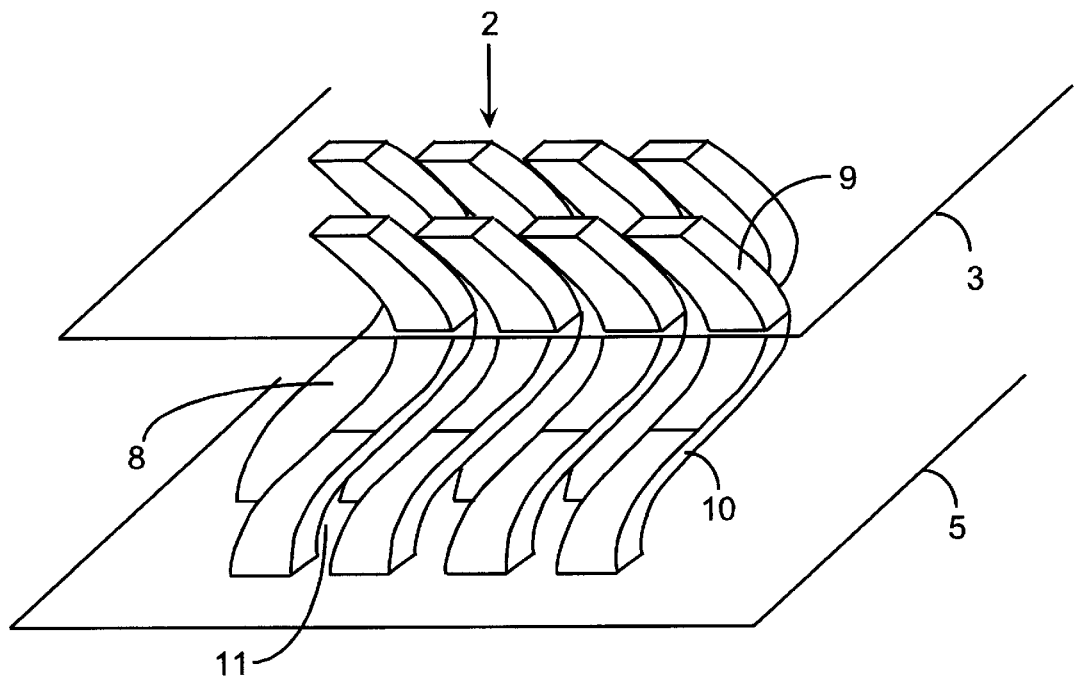
FIG. 3 shows an embodiment of a material implicating the process according to the invention.

FIG. 3 shows an embodiment of structural units forming the structure of such a material between incident surface 3 and radiating surface 5. Each of the structural units 8 which form a beam is in contact with incident surface 3 and radiating surface 5, and has two parts 9 and 10 which are inclined and curved in opposite directions to one another, and together form an angle. Structural units 8 are curved so as to be asymmetrical with respect to at least one parallel plane to the direction of the incident pressure wave. Part 9 of the structural unit forms an acute angle with incident surface 3, part 10 of the structural unit is bowed at its end according to a given radius.

Structural unit 8 is repeated and combined by juxtaposing as many times as required between surfaces 3 and 5, with a gap between each of said structural units defining cavities 11 which, like the structural units themselves, are asymmetrical.

Figure 4:
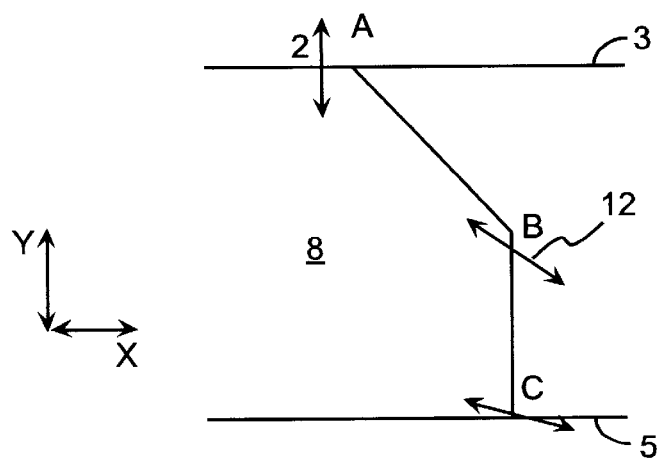
FIG. 4 shows the propagation of a wave in the case of the embodiment shown in FIG. 3.

FIG. 4 schematically shows the path and deviation of pressure wave 2, for example in the case for the material shown in FIG. 3. The vibrations of the wave, schematized by arrow 2 and perpendicular to incident surface 3, are deviated by structural unit 8 and take up the direction shown by arrow 12, which indicates the main direction of the vibrations at intermediary point B of unit 8. The particles located in the middle of unit 8 at point B are in fact reacting to the stressing of the pressure wave by movements whose direction is close to that of axis X.

Radiating surface 5 is thereafter exposed to slight movements along direction Y which are principally responsible for the wave whose propagation changes from a direction substantially parallel to radiating surface 5, or slightly intersecting it, with a rotational deviation at point B. Structural unit 8 is the centre of the vibrations, and the constitutive particles move both in translation and in rotation around the different axes depending on the shape of the structural units.

Designing specific structural units favours particle rotations which cause various distortions of the units in question and make it possible for the vibrations to be concentrated. The advantage of rotations over translations lies in the low acoustic radiation of the structural units.

Figure 5:
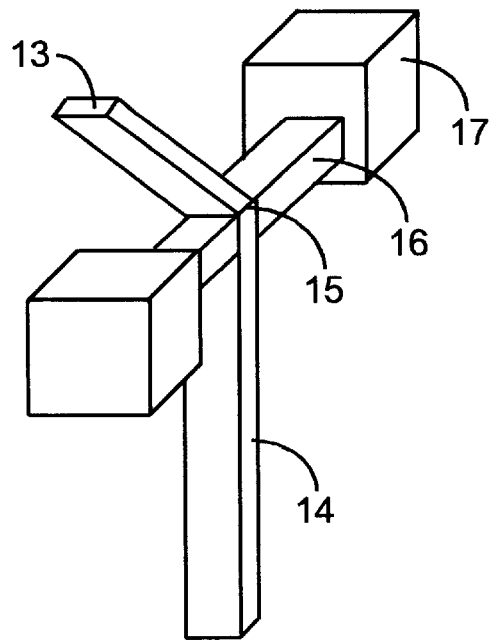
FIG. 5 shows another embodiment of a material implementing the process according to the invention.

FIG. 5 shows another embodiment of the three dimensional structural unit composed of beams and occasional solid volumes. The unit comprises an inclined beam 13 which touches the incident surface (not shown) followed by a beam 14 forming an obtuse angle with beam 13, and in contact with radiating surface 5 (not shown).

At connection point 15 of beams 13 and 14, transversal beams 16 are fastened associated with masses 17 which act as vibration accumulators. According to material thickness, which can for example extend from a few millimetres to two centimetres, the material structure can for example be made by laser cutting, bonding, folding, assembly of several layers or by stereo-lithography (laser resin curing).

Figure 6:
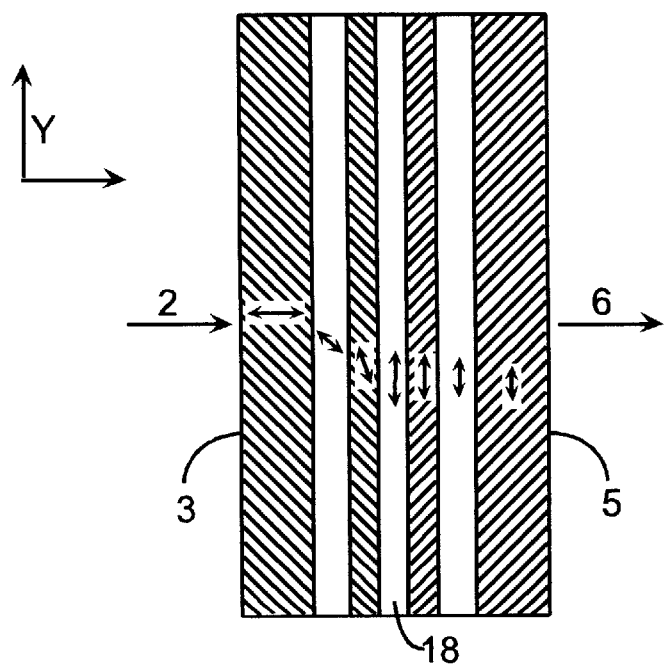
FIGS. 6 and 7 show two other embodiments of the invention.

The embodiment shown in FIG. 6 consisting in dissipating the energy of vibrations 2 by introducing a viscoelastic material into areas 18 where the energy of the vibratory wave is concentrated by the micro-geometry of the material. The material structure promotes deviation and favours one or several degrees of liberty of the material for which viscoelastic damping is the most efficient. Implementing the invention therefore enables the energy of vibratory wave 2 to be deviated, then dissipated in the form of heat into well defined areas and in directions which involve certain vibratory modes of non-acoustically radiating wall.

Figure 7:
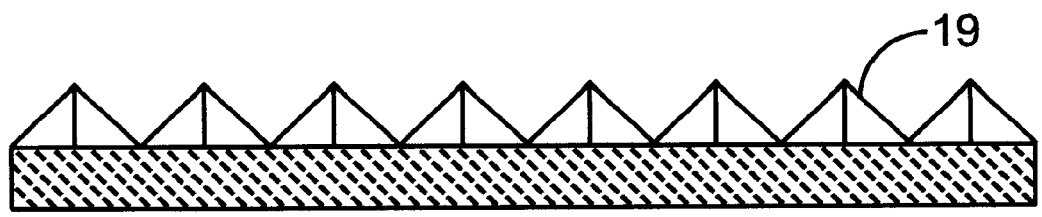
Figure 8:
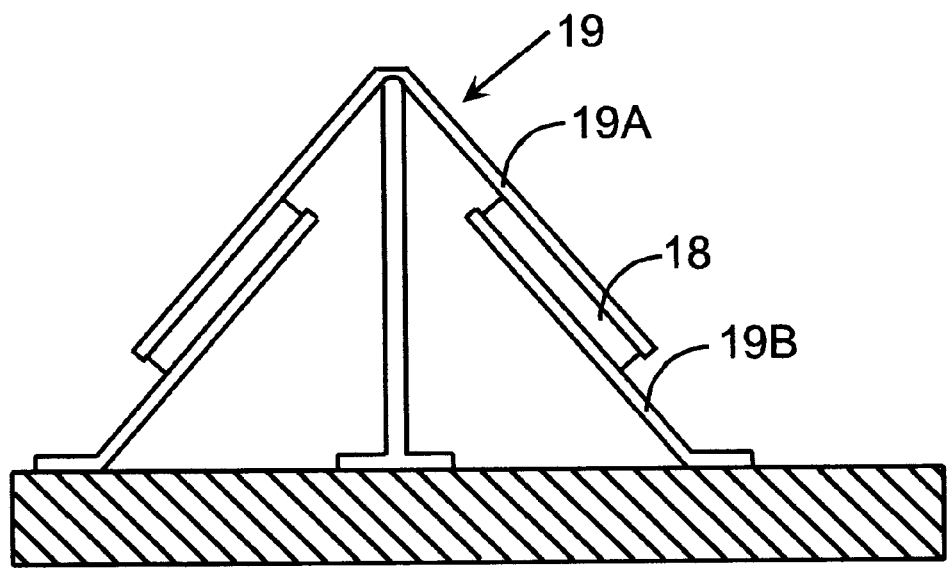
FIG. 8 is an enlarged view of a detail shown in FIG. 7.

With reference to FIGS. 7 and 8, anisotropical composite material 18 can be applied to a structure 19 exposed to vibro-acoustic behaviour considered harmful. The internal properties of composite material 18 influence the vibratory reaction of structure 19 positioned on a base 20 whose vibrations are to be damped.

Such damping effect is obtained by using the properties of structure of material 18 which deviates and modifies the amplitude of the internal vibrations. This modification enables one or more materials of composite structure 19 to convert the vibratory energy into another form of energy. In FIG. 8, energy-converting material 18 is arranged between two plates 19A and 19B of structure 19. Material 18 can be formed, for example, by viscoelastic elements, which can be piezoactive or magnetostrictive. In this case, such elements convert the vibratory energy into heal or electric energy.

What is claimed is:

1. A process to damp an amplitude of a vibration or pressure wave radiated by a radiating surface and an incident surface of a material exposed to vibrations of mechanical or acoustic origin, comprising: manufacturing a structure comprising a material comprised of an anisotropically-shaped heavy resilient material having an internal geometry that deviates vibrations standing inside the structure and localizes these vibrations into at least one well defined area of said structure.

2. A damping process according to claim 1, wherein modification of a direction of travel of internal vibrations is carried out from a substantially perpendicular direction to the incident surface to a substantially parallel direction to the radiating surface.

3. A damping process according to claim 1, wherein modification of the direction of internal vibrations is carried out by transforming a linear movement into a rotating movement.

4. A damping process according to claim 1, wherein the material comprises a plurality of internal geometric structural units combined together to form an asymmetrical anisotropical structure that disturbs vibro-acoustic waves.

5. A damping process according to claim 1, wherein an internal structure of the material is asymmetrical with respect to at least one plane parallel to the direction of an incident vibratory wave.

6. A damping process according to claim 1, wherein modification in direction and amplitudes of internal vibrations increases dissipated vibratory energy by locally applying a specific material that converts the vibratory energy into another form of energy.

7. A material that damps amplitude of vibrations and pressure waves radiated by a surface exposed to vibrations of a mechanical and/or acoustic origin, comprising: an anisotropically-shaped heavy resilient structure having an internal geometry able to deviate vibrations standing inside the structure and localize these vibrations into well defined areas within said structure.

8. A material according to claim 7, wherein the inner structure is asymmetrical with respect to at least one plane parallel to the direction of an incident vibratory wave.

9. A material according to claim 7, wherein the material structure comprises structural units having parts which are inclined and together form an angle, and contact an incident surface and a radiating surface.

10. A material according to claim 9, wherein at least one of the parts is inclined with respect to the incident surface of the material or with respect to the radiating surface.

11. A material according to claim 9, wherein the structural units comprise an assembly of a plurality of beams some of which are connected to masses for concentrating the vibrations.

12. A material according to claim 7, wherein the structural units of the structure are parallel to a rigid base, whose vibro-acoustic behaviour is to be damped, said structure being equipped with a specific material for converting vibratory energy into another form of energy.

13. A material according to claim 12, wherein the material is one of piezoactive, magnetostrictive, or viscoelastic elements arranged between relative movement rigid plates belonging to said structure.

14. The damping process according to claim 6, wherein said another form of energy is a form of electrical or heat energy.

15. A structural unit for damping vibrations created by a pressure wave in a structure comprising:

an asymmetric anisotropical structure wherein said asymmetric anisotropic structure comprises asymmetrical structural units and asymmetrical cavities between said asymmetrical structural units for disturbing wave transmission of vibrations within said structure.

16. The structural unit according to claim 15 wherein said asymmetric anisotropical structure is positioned between a first surface adapted to be incident to a pressure or vibrational wave, and a second surface substantially parallel to said first surface.

17. The structural unit according to claim 15 wherein said asymmetrical structural units comprise at least a first portion and a second portion, said first portion being inclined and curved in an opposite direction to said second portion.

18. The structural unit according to claim 17 wherein said first portion forms an acute angle with said first surface.

19. The structural unit according to claim 17 wherein said second portion is bowed at an end.

20. The structural unit according to claim 15 wherein said asymmetric anisotropical structure is capable of directing vibrational wave energy towards an area for consolidating vibrational energy.

21. A layered geometric structure for directing vibrational energy perpendicular to a direction of travel of a vibration or pressure wave comprising:

a first surface adapted to be incident to a vibration or pressure wave;

a second surface substantially parallel to said first surface; and, a plurality of layers of an energy directing material positioned between said first and second surfaces;

wherein said plurality of layers of an energy directing material comprises at least a layer of said plurality of layers in contact with said first surface for being absorbent to vibrational energy from said first surface and for directing said vibrational energy substantially parallel with a direction of travel of a vibration or pressure wave, and a second layer of said plurality of layers in contact with said first surface being absorbent to vibrational energy, said second surface for directing vibrational energy substantially perpendicular to said direction of travel of said vibration or pressure wave.

22. The layered geometric structure according to claim 21 wherein each successive layer of said plurality of layers in a direction of travel parallel to a direction of travel of said vibration or pressure wave and beginning at said first surface, have a greater energy directing ability than a layer next to said successive layer and nearer said first surface.

23. A structural damping unit comprising:

an incident surface adapted to be normal to a vibrational pressure wave;

a radiating surface;

a plurality of beams connecting said incident surface with said radiating surface; and at least one vibration accumulator;

wherein said plurality of beams include an inclined beam having a first end in contact with said incident surface and a second end in contact with a beam forming an obtuse angle with said inclined beam, and said end of the inclined beam contacting said beam forming an obtuse angle contacts at least one parallel beam coplanar to said incident surface, said parallel beam having said vibration accumulator attached at an opposite end thereof.

* * * * *

UNITED STATES PATENT AND TRADEMARK OFFICE
CERTIFICATE OF CORRECTION

PATENT NO. : 6,068,081
DATED : May 30, 2000
INVENTOR(S) : Marc CAPDEPUY et al.

It is certified that error appears in the above-indentified patent and that said Letters Patent is hereby corrected as shown below:

On the title page:

[30] Foreign Application Priority Data, change "Sep. 27, 1995" to --Sep. 21, 1995--.

Signed and Sealed this

Twenty-fourth Day of April, 2001

Attest:

NICHOLAS P. GODICI

Attesting Officer        Acting Director of the United States Patent and Trademark Office